Nov. 3, 1959        W. J. MORELAND        2,911,168
DIFFERENTIALLY CONTROLLED TWIN WHEEL LANDING GEAR
Filed Oct. 25, 1955        3 Sheets-Sheet 3

INVENTOR.
WILLIAM J. MORELAND
BY
ATTORNEYS

United States Patent Office 2,911,168
Patented Nov. 3, 1959

2,911,168

DIFFERENTIALLY CONTROLLED TWIN WHEEL LANDING GEAR

William J. Moreland, Dayton, Ohio, assignor to the United States of America as represented by the Secretary of the Air Force Application October 25, 1955, Serial No. 542,795

11 Claims. (Cl. 244—50)

(Granted under Title 35, U.S. Code (1952), sec. 266)

The invention described herein may be manufactured and used by or for the United States Government for governmental purposes without payment to me of any royalty thereon.

This invention relates to the steering, braking and stabilization of an aircraft twin-wheel castering nose gear.

According to the present invention a pair of nose gear wheels are mounted on axially aligned shafts, said shafts being coupled by means of a controlled slip anti-shimmy clutch. The action of said clutch is responsive to a hydraulic system actuated by either or both of the main brake pedals.

When both brake pedals are depressed the same distance simultaneously, equal pressures are transmitted to the brake drums of each of the caster nose wheels and the anti-shimmy clutch is fully engaged so that said wheels will rotate in unison with substantially no slip.

If only one pedal is depressed, braking force is transmitted to the brake drum of one wheel and a differential member is actuated to raise the hydraulic pressure in the clutch actuating master cylinder. This pressure operates an actuator arm which, in turn, reduces the pressure on the normally closed anti-shimmy clutch and allows the nose gear wheels to rotate relative to one another. In such a case, the aircraft will pivot about the nose wheel upon which the braking pressure was applied and the other of the nose wheels will be permitted to rotate about the pivoted wheel at a faster speed than if said wheels were coupled with no slip.

If both pedals are depressed, but through unequal distances, simultaneous braking and steering will result due to the unequal brake drum pressures. In this manner, steering of the aircraft may be varied from an abrupt pivotal turn about one nose wheel to a very gradual long-radius turn.

The main gear brakes are supplied through a pressure actuated valve connected to the hydraulic systems actuated by each brake pedal and feeding the hydraulic line to the main brakes. The action of the valve is such that the pressure exerted on the main gear drums is equal to the lesser of the two pressures of the master brake cylinders. When equal pressures exist in the cylinders a common hydraulic pressure is exerted through said valve to the main gear brakes, as well as the coupled nose gear brakes.

One advantage of the present system is that it permits high steering torque with minimum power level in all positions of the nose gear. In present steering equipment, a high pressure oil supply and considerable power are needed when used with co-rotating twin wheels.

Another advantage is the elimination of transmitting steering torques through struts, scissor linkages and wheel bearings.

An added advantage is the elimination of steering and damping cylinders and steering linkage with their attendant low mechanical advantages in the extreme positions. An additional advantage of this invention is to provide smooth, graduated steering at low power level by overcoming inertia of the castering portion of the strut rather than the entire aircraft.

Still another advantage is to provide hydraulic braking on all wheels of the aircraft, including the nose wheels.

Another advantage is to provide directional stability and shimmy-free operation.

A further advantage is the performance of all the above functions with less weight and complexity than is necessary with present auxiliary equipment.

An object of the present invention is to allow the pilot, while on the ground, to steer, brake and stabilize his aircraft solely by means of his brake pedals and independent of the operation of the rudder.

Other objects and features of the invention will become apparent from the description that follows.

Figure 1:
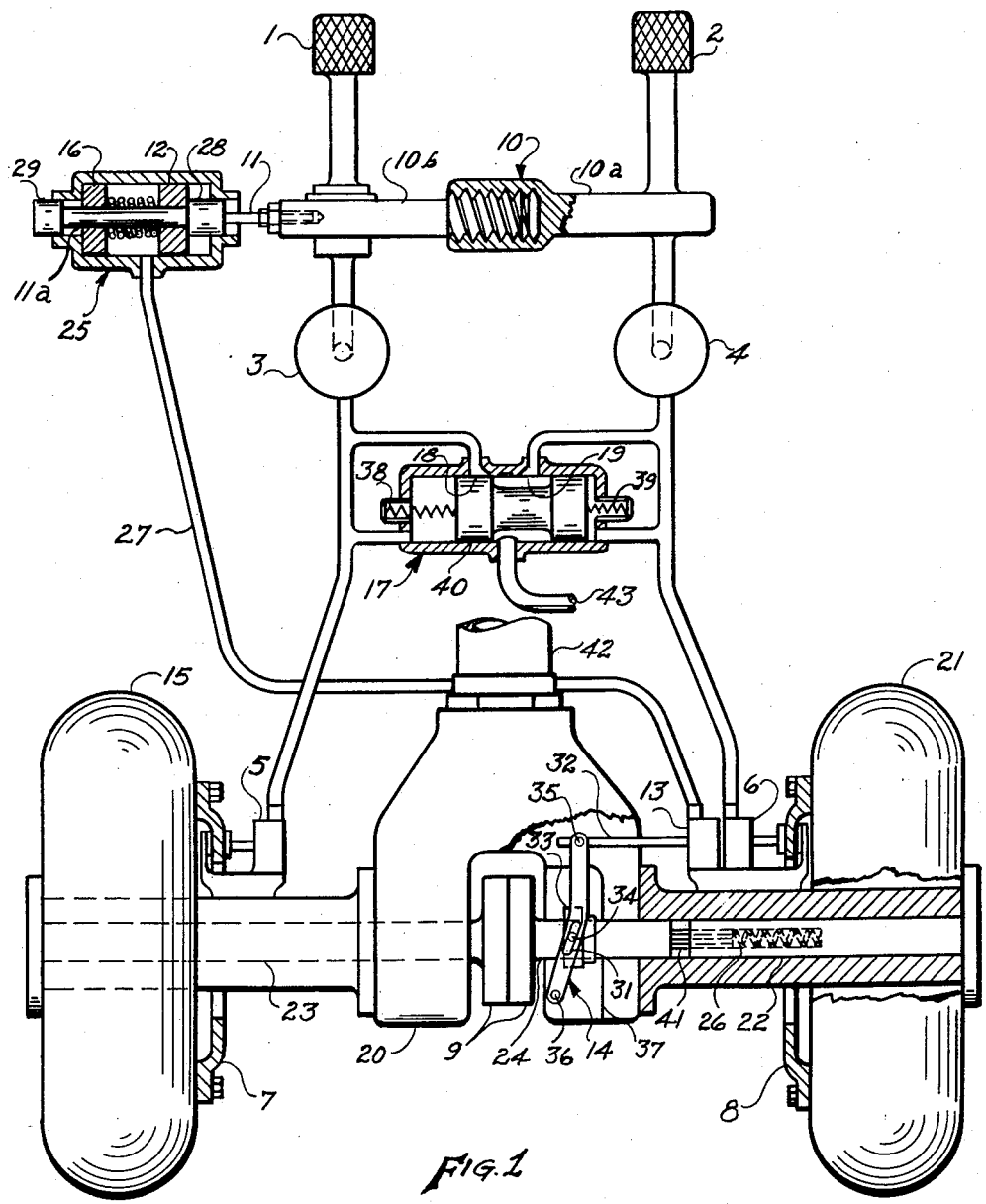
Fig. 1 is a vertical view, partly in section, of a twin nose gear and the braking, steering and stabilizing mechanism therefor.

In the drawing, a vertical strut 42 is rigidly secured to the nose of the aircraft and a yoke-shaped housing member 20 is swivelly journalled about the vertical axis of said strut. Shafts 22 and 23 are journalled within said housing member. Landing nose gear wheels 15 and 21 are secured to the ends of said shafts. With the axis of the strut 42 vertical the arms of the yoke shaped housing member 20 must extend rearward so that the center of rotation of the wheels 15 and 21 is aft of the axis of the strut 42 producing a castered nose wheel gear with mechanical trail. In lieu of such a construction the axis of the strut 42 may be inclined forward with the housing journalled to rotate about the axis of the forwardly inclined strut and the arrangement being such that the axis of the strut extended intersects the ground plane forward of the point of contact of the wheels therewith and producing a castered nose wheel assembly with geometric trail. Since both such castering arrangements are well known no illustration thereof is believed to be necessary.

Shaft 24 is keyed or splined (as shown) at 41 to shaft 22 and rotates with it. Shaft 24 is positioned axially by the opposing forces of spring 26 and clutch actuator arm 14. The wheels rotate independently except when joined by anti-shimmy clutch 9.

Upon depressing brake pedals 1 and 2, simultaneously, through the same distances, equal hydraulic pressures are generated in the master cylinders 3 and 4, respectively. Said pressures are transmitted to the brake actuators 5 and 6, respectively, which, in turn, supply equal pressures on the brake drums 7 and 8, respectively.

The brake pedals 1 and 2 have mounted therebetween a nut and screw type differential generally indicated by the reference numeral 10 and including a shaft 10a counterbored and threaded to form a nut which cooperates with the threaded end on a shaft 10b. Shaft 10a and its integral nut are rotatably connected to pedal 2 and shaft 10b and its integral thread have a sliding key connection to pedal 1 such that depression of pedal 1 causes rotation of shaft 10b. The shaft 10b is by means of its keyed connection capable of axial movement relative to the bearing of pedal 1.

The shaft 10b is connected by a shaft extension 11 to the piston rod 11a of a clutch operating master cylinder assembly generally indicated by the reference numeral 25. The master cylinder 25 has a fluid pressure outlet conduit 27 and its piston rod 11a has a pair of pistons 12 and 16 slidably mounted thereon and held apart by a spring. Heads 28 and 29 are provided on piston rod 11a so that movement of shaft 11 to the left causes head 28 to engage piston 12 to develop a fluid pressure in conduit 27. Movement of the shaft 11 to the right causes head 29 to engage piston 16 to similarly develop a fluid pressure in conduit 27.

If pedal 1 is depressed the shaft 10b will be rotated with its thread causing a feeding movement of the shaft 11 to the left and similarly if pedal 2 alone is depressed the nut of the differential will rotate with its integral shaft 10a causing a movement of shaft 11 to the right. Differential movement of pedals 1 and 2 will cause shaft 11 to move due to action of differential 10 an amount proportional to the difference in pedal movement and in the direction corresponding to the greater pedal movement. When both pedals 1 and 2 are depressed together an equal amount there will be no displacement of shaft 11. An electric or hydraulic differential may be used for this purpose as well as the mechanical differential shown.

Movement of shaft 11 to the left causes piston 12 to move to the left thus raising the hydraulic pressure in the clutch master cylinder 25. This pressure in turn supplies the clutch actuator 13, through hydraulic line 27, which moves a clutch actuator arm 14 to decrease the pressure on and increase the slip of clutch 9. The clutch actuator arm 14 is in the form of a yoke, having two inwardly inclined lower portions joined by a vertical upper portion. A slot 31 is provided at the upper end of each of said inclined lower portions. The shaft 24 has a throwout bearing 33 secured thereto and a pair of pins 34 which radiate therefrom. The lower portions of the yoke straddle shaft 24 and slots 31 are each penetrated by one of pins 34. The upper end of the arm 14 is pivoted to clutch arm 32 by pin 35 and the lower portion of arm 14 is pivotally secured to the right hand leg of the yoke 20 by pin 36. When the pressure in master clutch cylinder 25 is raised, clutch actuator 13 will force rod 32 to the right, forcing arm 14 to pivot clockwise about pin 36. Due to the connection of rod 32 to arm 14 by pivot pin 35, pins 34 will be cammed within slots 31 and thereupon force shaft 24 to the right against the force of spring 26 and thereby reduce the pressure on clutch 9. The lower end of the right portion of the yoke 20 is provided with a recess 37 to allow free movement of clutch arm 14. The force acting on brake drum 7 creates a friction force on the runway in the plane of wheel 15 in the direction of the aircraft. The reaction to this force creates a turning movement about the strut swivel axis which causes the taxiing aircraft to assume a curved path. Since the pressure on clutch 9 is now reduced, the faster speed of the wheel on the outside of the turn is not impeded. The sharpness of the turn is controlled by the amount of movement of the foot pedal.

To accomplish very sharp turns at low speed it may be desirable to completely decouple the nose wheels 15 and 21 and under such circumstances the clutch 9 and its operating mechanism may be designed to have one hundred percent slip when either brake pedal is fully depressed producing a maximum displacement of shaft 11 and a corresponding maximum output pressure from the master cylinder assembly 25.

If pedal 2 alone is depressed, the differential 10 causes shaft 11 to drive piston 16 to the right, by means of enlarged head 29, which operates the clutch actuator 13 to reduce pressure on clutch 9. The braking force, which now acts on drum 8, will turn the aircraft in a direction opposite to the direction of movement when pedal 1 was depressed.

If both pedals are depressed simultaneously but through unequal distances, simultaneous braking and steering will result from the unequal brake drum pressures. The amount of pressure between clutch discs 9 is dependent upon the difference in movement applied to pedals 1 and 2. When this difference is small the clutch pressure is only slightly reduced, thus permitting long-radius steering without sacrificing the stabilizing effect of co-rotating wheels.

The main gear brakes are supplied through a valve 17 having a valve slide 40 centered by springs 38 and 39. Said valve 17 is actuated by the greater of the two pressures in the brake master cylinders 3 and 4 and operates to connect the master cylinder having the lesser pressure to the main gear brakes through the main landing gear brake line 43. For example, if pedal 1 is moved through a greater distance than pedal 2, the higher pressure on the left of valve slide 40 moves it to the right closing off the higher pressure port 18 but permitting pressure from 19 to pass through the valve to the brake actuators of the main gear (not shown). When equal pressures exist in cylinders 3 and 4, valve slide 40 is centered thus connecting both master cylinders to the main gear brake system. This arrangement permits steering without application of the main gear brakes by depressing only one of the pedals. Valve 17 in this case prevents actuation of the main gear brakes by connecting the main gear hydraulic system to the master cylinder of this other pedal to which no braking pressure has been applied.

Figure 2:
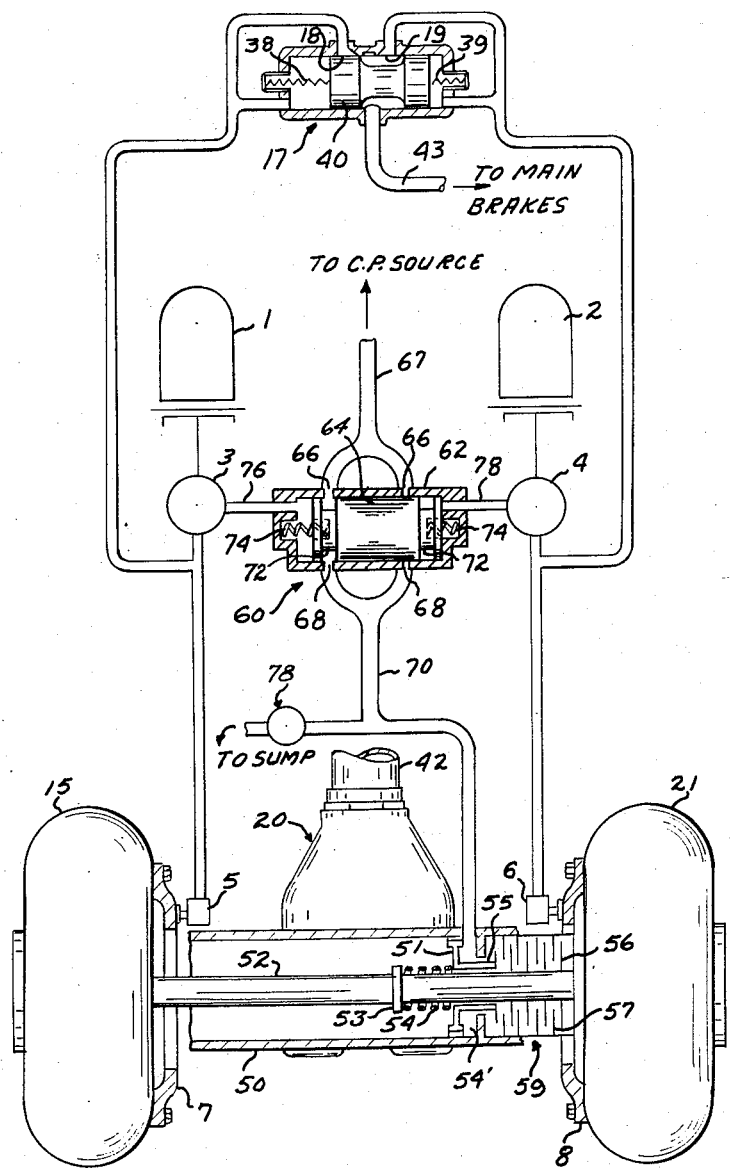
Fig. 2 is a view similar to Fig. 1 illustrating a modified form of the invention employing a hydraulic differential valve for controlling the stabilizing clutch.

In the modified form of the invention as illustrated in Fig. 2 parts corresponding to the system of Fig. 1 are indicated by the same reference numerals. As seen in Fig. 2, brake pedals 1 and 2 are mounted for pivotal movement and adapted to actuate respective brake master cylinders 3 and 4. Fluid pressures from the master cylinders 3 and 4 actuate the respective brake actuators 5 and 6 to apply braking pressures to brake drums 7 and 8, respectively, in the same manner as in the device of Fig. 1.

Fluid pressure in brake cylinders 3 and 4 operate valve assembly 40 to supply fluid pressure to the main leading gear brake line 43 in the same manner as in the system of Fig. 1.

In the device of Fig. 2 the housing 20 includes a hydraulic cylinder 50 having a piston 51 reciprocal therein and slidable on the axle shaft 52 to which wheel 15 is secured. Wheel 21 is freely rotatably journalled on the axle shaft 52. Axle shaft 52 has a thrust collar 53 mounted thereon which serves as an abutment for a strong spring 54 which engages the piston 51 urging the same to the right and resisting the inlet of fluid in the expansible chamber 54' in cylinder 50. The piston 51 is provided with a collar 55 which serves as a means to exert pressure on a stack of parallel friction clutch discs 56 splined on axle shaft 52 to rotate therewith but axially movable with respect thereto. Clutch discs 56 cooperate with corresponding parallel clutch discs 57 carried by the housing of clutch 59 secured to and rotatable with wheel 21. Clutch discs 56 and 57 are normally engaged under the action of spring 54 so as to couple wheels 15 and 21 to rotate in unison.

Application of hydraulic fluid pressure to chamber 54' in cylinder 50 will cause the pressure on piston 51 to oppose the force of spring 54 and relieve the pressure on clutch discs 56 and 57 permitting the clutch to slip and allow relative rotation between wheels 15 and 21 but retaining sufficient coupling to frictionally damp any tendency toward wheel shimmy. The degree of slip of the clutch assembly 59 is thus proportional to the magnitude of fluid pressure delivered into the chamber 54' of cylinder 50.

The piston valve 64 is provided with a pair of metering grooves 72 which cooperate with the ports 66 and 68 to meter the pressure of fluid flowing from the inlet ports 66 to outlet ports 68 depending on the amount of displacement of valve 64 in either direction from its neutral position.

Strong centralizing springs 74 normally centralize valve 64 in its neutral position and act on opposite ends of the piston valve. The valve housing at its opposite ends is connected by conduits 76 and 78 to the respective brake master cylinders 3 and 4.

When pedal 1 is depressed alone, fluid pressure in brake master cylinder 3 shifts valve 64 to the right against the resistance of one of centralizing springs 74 an amount proportional to the pressure within the brake master cylinder 3. Movement of valve 64 permits flow of fluid from inlet ports 66 to outlet ports 68, conduit 70 and the clutch 59 to produce a slip proportional to the valve displacement.

Displacement of pedal 2 alone will cause a shift of valve 64 to the left of its neutral position to produce a proportional increase in pressure in chamber 54' of cylinder 50 and a corresponding reduction of pressure acting on the clutch 59.

Differential movement of brake pedals 1 and 2 will shift the valve an amount proportional to the difference in pressures in the brake master cylinders 3 and 4 and will produce a slip on clutch 59 proportional to the difference in pedal movement.

Equal movement of brake pedals 1 and 2 will produce equal and opposing pressures on valve 64 so that the same will remain centered in its neutral position and lap the outlet ports 68 so that no pressure will be transmitted to the clutch 59. In order to prevent trapping high pressure fluid in the chamber 54' of cylinder 50 an adjustable leak valve 78 connected to conduit 70 and venting to a sump (not shown) is provided. This valve by providing a high pressure drop will not interfere in the normal operation of the system.

The device of Fig. 2 is thus seen to be identical in operation with that of Fig. 1.

Figure 4:
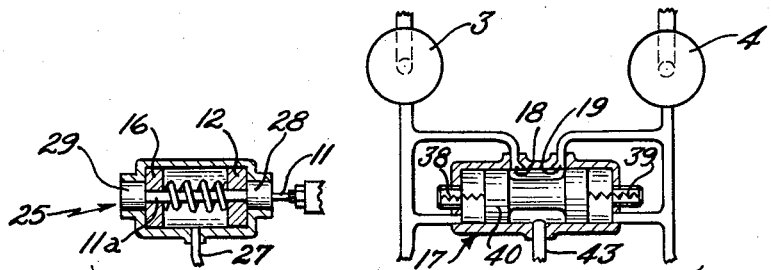
Fig. 4 is a schematic view of the brake and clutch controlling valves in neutral position.

Slip of the cooperating clutch members 9 is controlled by the valve 25. When the pistons 12 and 16 of the valve 25 are in the position shown in Fig. 4, it is clear that there is no pressure applied to the fluid in the valve 25, the tube 27 and the hydraulic clutch actuator 13 and, accordingly, the entire pressure of the heavy spring 26 is effective to press the clutch plates 9 together to provide minimum slip. However, when either the pedal 1 or the pedal 2 is moved or swung over a greater distance than the other, then either the piston 12 or the piston 16 will be displaced from the position shown in Fig. 4 toward the position shown in either Fig. 1 or Fig. 5. The extent of displacement of either the valve 12 or 16 is dependent upon the extent of differential movement of the pedals 1 and 2. For example, the pedal 1 may be pushed to the limit of its movement which would apply maximum braking pressure to the brake 7 and also apply maximum pressure to the clutch actuator 13 through the movement of the piston 12 to a position of maximum displacement. The hydraulic pressure in the actuator 13 would be effective to transmit somewhat greater pressure to the shaft 24 than is applied in the opposite direction by the heavy spring 26 thus tending to separate the clutch plates 9 thus providing for maximum slip.

It is evident from the above that when the pedals 1 and 2 are moved the same distance, equal braking pressure will be applied to the nose wheels 15 and 21 while the clutch plates 9 would be held in substantially locked relation. However, when there is differential movement of the pedals, the application of pressure by the clutch actuator 13 to the clutch plates 9, 9 in a direction opposed to pressure of the spring 26 increases as the differential movement of the pedals increases. The slip of the clutch 9, 9 thus is controlled by the pilot, by increasing or decreasing the fluid pressure in the valve 25 which is in turn transmitted to the clutch actuator 13.

Figure 5:
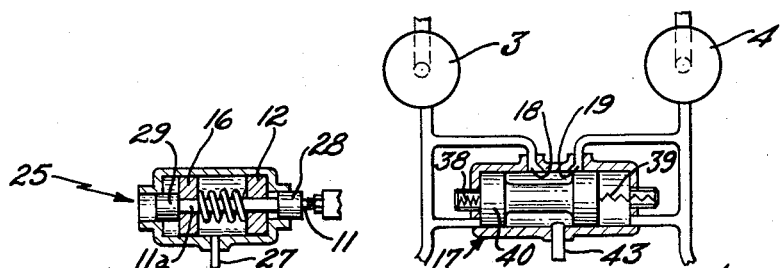
Fig. 5 is a view similar to Fig. 4 but showing the valves in position to brake the right hand nose wheel.
Figure 3:
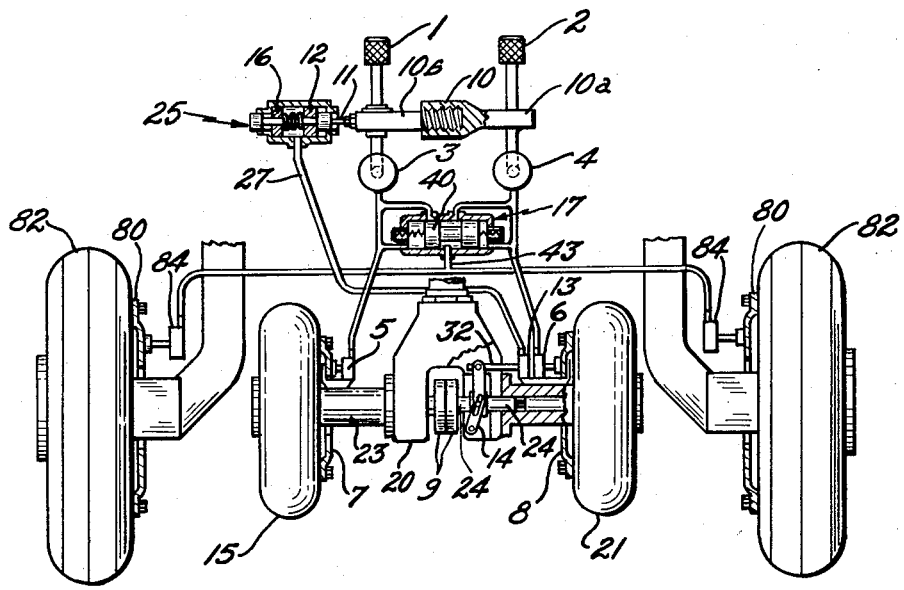
Fig. 3 is a view in elevation showing a complete landing gear.

Not only does the illustrated construction provide a friction clutch wherein the slip is controlled in accordance with differential movement of the pedals 1, 2 but also provides a brake system wherein brake pressures on each wheel vary in accordance with the differential movement of said pedals. The valve 17 is provided with a double ended piston 40 having a reduced central portion which permits hydraulic pressure to be applied to the main wheel brakes 80 fixed to main landing wheel 82 through a pair of hydraulic pistons 84 through the oil line 43. This pressure is controlled by the brake pedals 1 and 2. If no turning is desired, braking pressure is applied to the brakes 80 by movement of both brake pedals 1 and 2. However, if it is desired to turn the plane, braking pressure to the main brakes 80 is effected by only one of the pedals 1 or 2. For example, if it is desired to turn to the right, the valves 17 and 25 will be positioned as shown in Fig. 5. The pedal 1 will provide braking for the main brakes 80 while the pedal 2 will apply braking pressure to the right hand nose wheel 21.

Other embodiments and variations from the constructions disclosed herein may be made within the scope of the invention and all such variations are intended to come within the scope of the claims appended hereto.

I claim:

1. A steering and braking system for aircraft having a brakable main landing gear and a castering twin wheel nose gear comprising: braking means for each of said nose wheels; a pair of brake pedals; an actuating linkage between each of said pedals and a respective one of said nose brake wheels; a slippable clutch for frictionally coupling said nose wheels for synchronous rotation and permitting a controlled slip of one wheel with respect to the other by a reduction in clutch pressure, means responsive to differential operation of said pedals to reduce the clutch pressure and increase the slip thereof; a linkage means between said pedals and the main landing gear brakes; and means forming part of said linkage means and acting under the influence of unequal pressures on said pedals to disable the linkage between said main gear brakes and the pedal having the greater pressure.

2. A device as set forth in claim 1, wherein a transmission means selectively connects said brake pedals to the clutch and the means responsive to differential operation of said pedals to reduce the coupling effect of the clutch, includes a differential member, a connecting shaft aligned with said member, a clutch master cylinder having a piston shaft, a pair of pistons spaced intermediately along said shaft and enlarged end portions aligned with said connecting shaft and said member.

3. A device as claimed in claim 1, wherein the means which when under the influence of unequal pressures on said pedals disables the linkage between the main gear brakes and the pedal having the higher pressure comprises a slide valve, said actuating linkage including two main transmission lines each individually operatively connected to one of said brake pedals, a valve housing for said slide valve connected to a pair of inlet lines from each of said two main lines, said slide valve being connected in parallel between said main lines and spring-centered within said housing, one of each pair of inlet lines connected to the valve housing to move the valve slide in selective linear positions in response to the main line of higher pressure, a main outlet port in said housing forming part of said main landing gear brake linkage means, the other of said pairs of inlet lines connected to the main line of the lower pressure, through the valve and main outlet port to enable the pressure of the lower pressure line to be applied to the main gear brakes.

4. A steering and braking system for aircraft of the character having a castering twin nose gear comprising; independent braking means for each wheel of the said nose gear, a pair of brake pedals; an actuating linkage between each of said pedals and a respective one of said nose wheel brakes, a variable slip coupling between said nose wheels normally effective to couple said wheels without slip and a brake pedal differential connected between said brake pedals and to said slip coupling operative upon differential movement of said brake pedals to increase the slip of said coupling proportional to the magnitude of said brake pedal differential.

5. A steerable landing gear for aircraft of the type having a castered twin wheel nose gear and including a swivelled housing, a pair of axle shafts concentrically mounted in said housing, a respective nose wheel being secured to each axle shaft, slippable clutch means for frictionally coupling said shafts for common rotation and for permitting a controlled slip by reduction of clutch pressure, a fluid pressure clutch operating means, independent braking means for each of said twin nose wheels, an independent brake pedal actuated fluid pressure generating means operatively connected to each of said independent braking means, and means for generating a fluid pressure proportional to the difference in movement of the brake pedals operatively connected to said fluid pressure clutch operating means whereby the slip of said clutch means is proportional to the differential in brake pedal movement.

6. The structure as claimed in claim 5, in which the aircraft landing gear is provided with fluid pressure actuated main gear braking means, a shuttle valve having an outlet connected to said main gear braking means for transmission of braking fluid pressure thereto, an inlet connection between each brake pedal actuated fluid pressure generating means and said shuttle valve, said shuttle valve being operative when centralized to connect both of said pedal actuated fluid pressure generating means to the valve outlet and said valve being operative upon a difference in pressure between said valve inlets to move the valve to connect the outlet solely to the inlet fluid pressure of lower value.

7. The structure as claimed in claim 6, in which the shuttle valve for controlling the application of fluid pressure to the main gear brakes comprises a valve housing, a spool type valve reciprocable in said housing, yielding means for normally centering said valve in the housing, said housing being provided with a chamber at each end of the valve, an outlet leading from said housing, a pair of spaced ports in said housing normally communicating with the outlet when the valve spool is centered but adapted to be selectively lapped by a valve head on the valve spool when the latter is in either of its displaced positions, each inlet connection to the valve communicating with one of the chambers at the end of the valve and to the adjacent one of said spaced ports whereby there is a direct communication between the inlets and the valve outlet when the inlet pressures are substantially equal, while unequal pressures in the inlets and in said chambers produces an unbalanced force shifting said valve spool such that the port connected to the inlet of higher pressure is lapped by the valve and the port connected to the inlet of lower pressure is connected to the valve outlet.

8. A steering and braking system for aircraft having main landing gear wheels and a castering twin nose wheel gear, fluid pressure actuated braking means on said main gear wheels and on each of said nose wheels, a pair of brake pedals, a pressure generating means operatively connected to a respective nose wheel braking means and actuated by one of said brake pedals, a controlled slip clutch means operatively connected to said nose wheels to normally cause co-rotation of said nose wheels but permitting a controlled frictional slip therebetween upon reduction of clutch pressure, means responsive to the differential operation of said brake pedals for reducing the pressure on said clutch means proportional to the magnitude of said pedal differential operation, a valve means operatively connecting said brake pedal actuated pressure generating means to the main landing gear braking means in parallel, said valve means being operative upon a differential in pedal movement to transmit only the lesser of the two braking pressures to the main gear wheel braking means.

9. In a steerable castered twin wheel nose gear for aircraft, an independent braking system for each nose wheel, a pair of brake pedals each operatively associated with one of said braking systems for actuating the same, a friction clutch for normally coupling said nose wheels together for common rotation, a clutch operator for relieving the closing pressure on said clutch to permit a predetermined slip thereof, and a valve connected to said clutch operator for supplying an operating fluid pressure thereto controlled in response to the differential in the forces applied to the brake pedals.

10. The structure as claimed in claim 9, in which the braking systems for the nose wheels are of the fluid pressure type in which the braking pressure is a function of the force applied to the brake pedals and a valve means having an outlet for supplying main wheel brake pressure, said valve means being operative to connect said outlet in parallel to each braking system when the pressures therein are equal and only to the system of lower pressure when the braking system pressures are unequal.

11. In a landing gear for aircraft a castered twin wheel nose gear steerable by differential braking of the nose wheels, braking means for independently braking each nose wheel and including a pair of brake pedals one for each wheel, each of said nose wheels being journalled for independent rotation, pressure responsive means for normally frictionally coupling said nose wheels for co-rotation and permitting a controlled slip between said nose wheels in response to a reduction in control pressure, means for generating a control pressure and operatively connected to said pressure responsive means, said last named means being responsive to the differential in the braking force applied to the respective brake pedals.

References Cited in the file of this patent

UNITED STATES PATENTS

| | | |
|---|---|---|
| 1,822,714 | Tatter | Sept. 8, 1931 |
| 1,858,647 | Von Hilvety | May 17, 1932 |
| 2,503,755 | Martin | Apr. 11, 1950 |
| 2,644,654 | Mercier | July 7, 1953 |
| 2,687,857 | Caldwell | Aug. 31, 1954 |
| 2,717,745 | Carter | Sept. 13, 1955 |
| 2,741,337 | Ziskal | Apr. 10, 1956 |

FOREIGN PATENTS

| | | |
|---|---|---|
| 951,950 | France | Apr. 25, 1949 |